July 19, 1938.　　T. H. SCHOEPF ET AL　　2,124,125
BRAKING AND TRACTION CONTROL
Filed May 7, 1937　　6 Sheets-Sheet 1
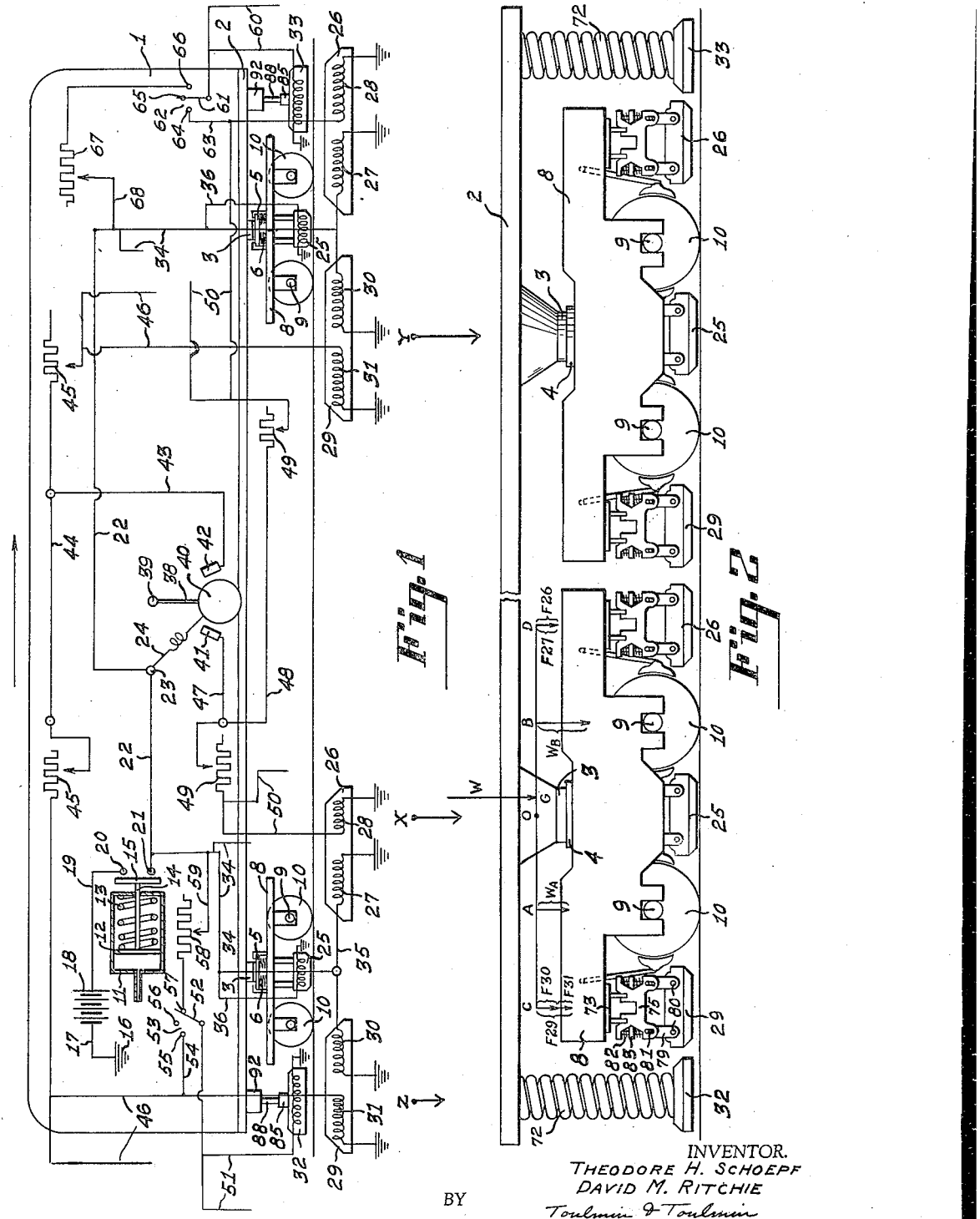
INVENTOR.
THEODORE H. SCHOEPF
DAVID M. RITCHIE
BY Toulmin & Toulmin
ATTORNEYS

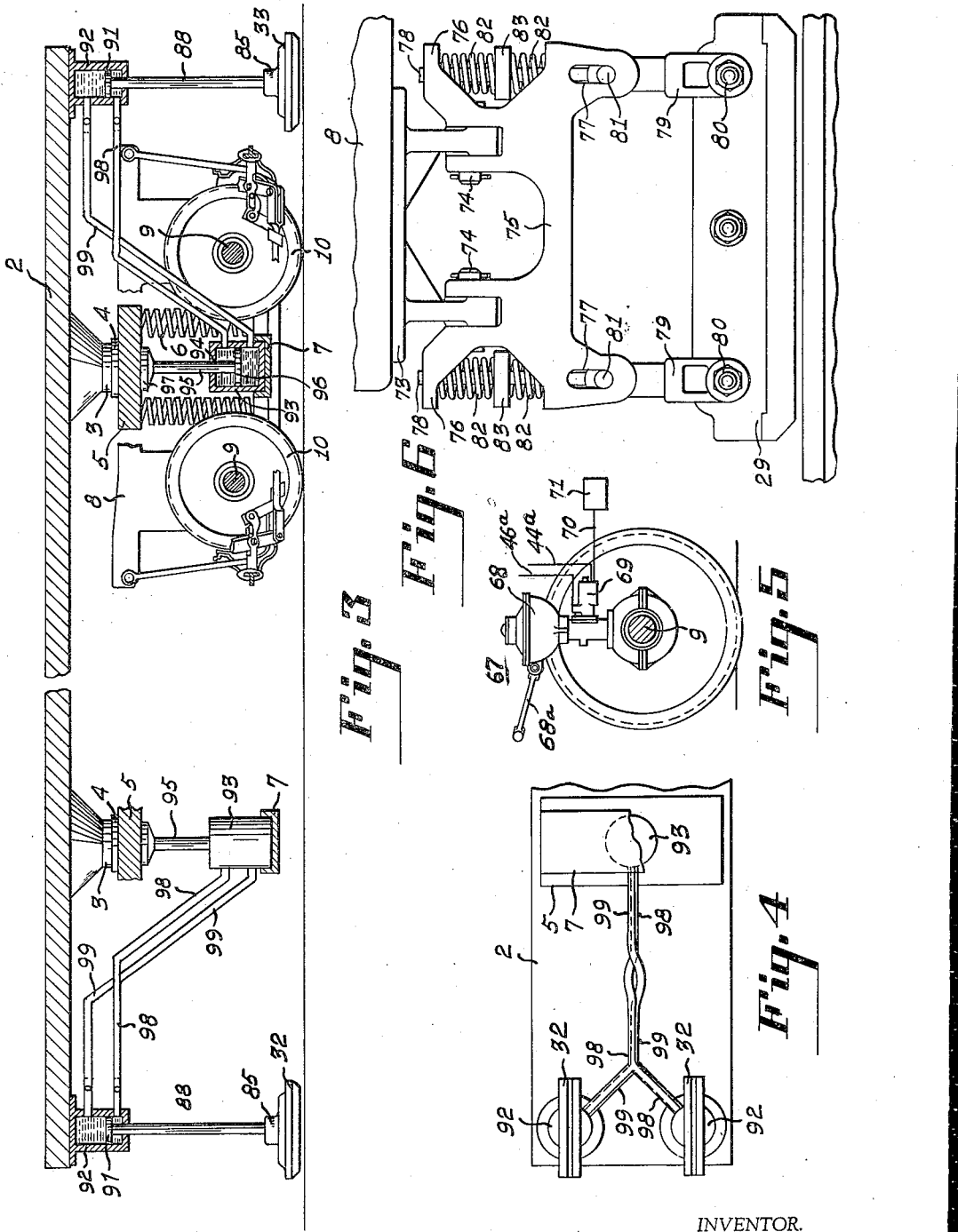

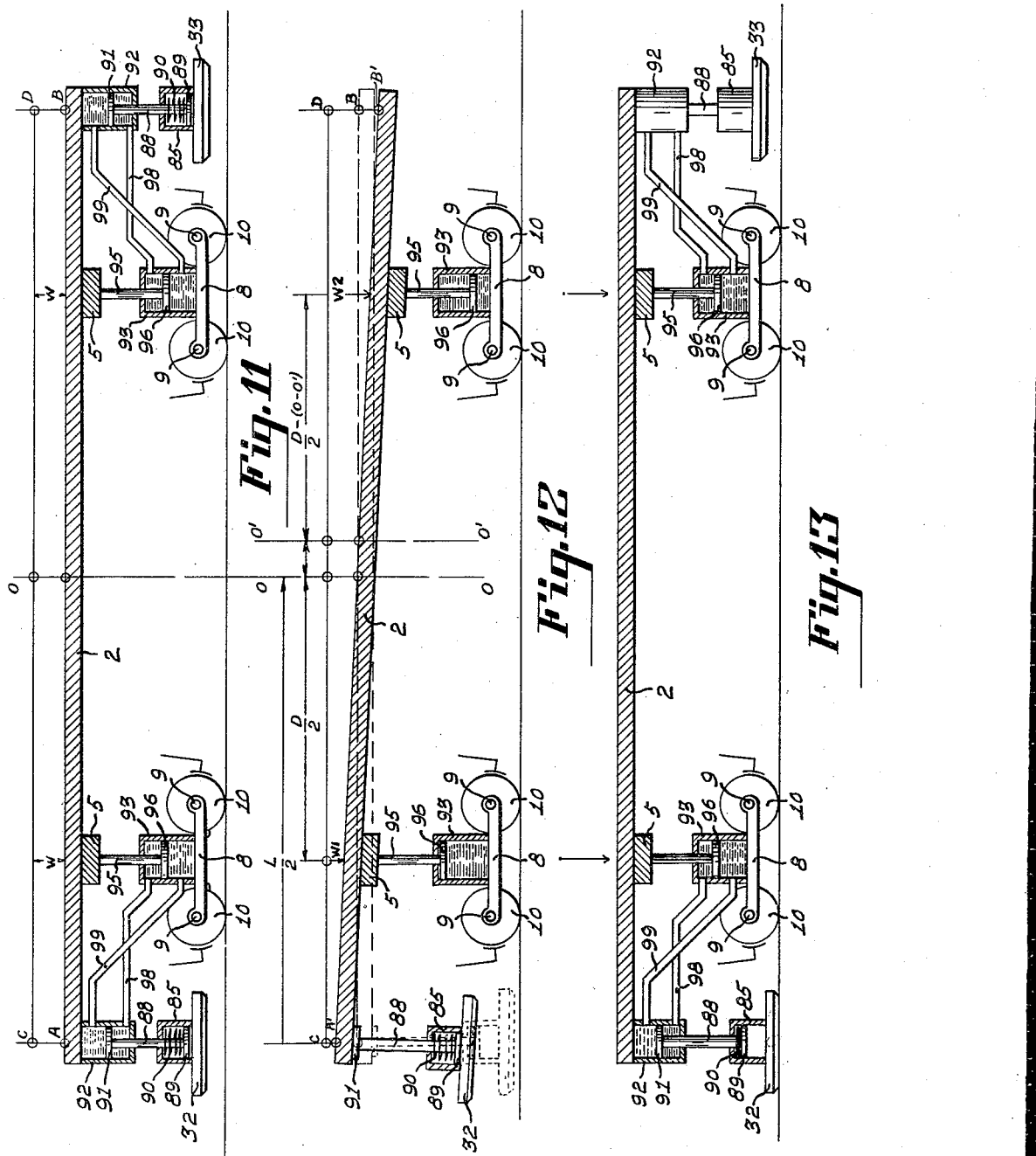

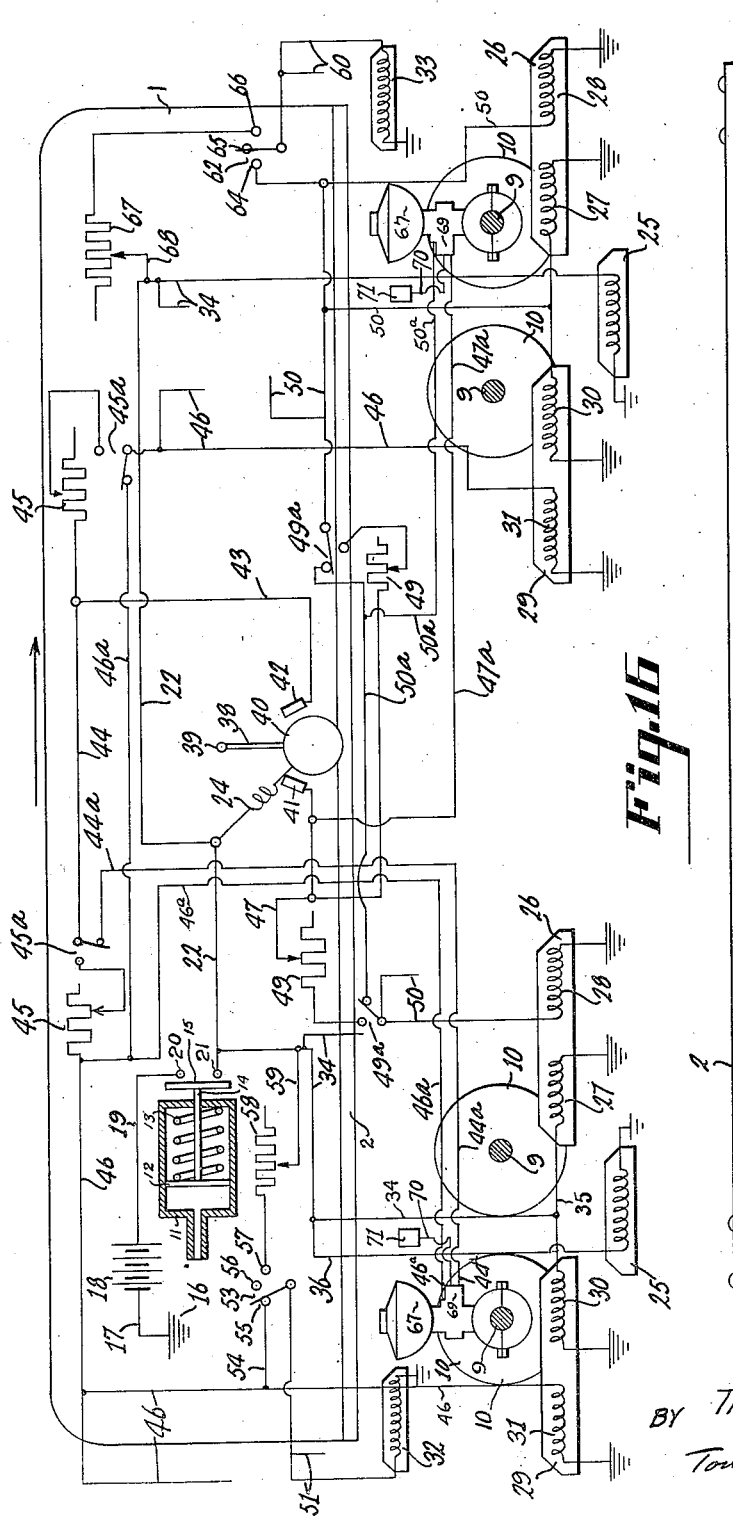

Patented July 19, 1938

2,124,125

UNITED STATES PATENT OFFICE 2,124,125

BRAKING AND TRACTION CONTROL

Theodore H. Schoepf and David M. Ritchie, Cincinnati, Ohio, assignors to The Cincinnati Traction Building Company, Cincinnati, Ohio, a corporation of Ohio Application May 7, 1937, Serial No. 141,240

60 Claims. (Cl. 188—33)

This invention relates to braking of railway vehicles.

It is an object of this invention to provide for a railway vehicle a system of magnetic track brakes so located, proportioned and controlled as to provide uniform traction between the respective wheels of a railway vehicle and the supporting track rails.

It is a further object of this invention to provide means whereby equal braking effect may be exerted by the wheel brakes upon the wheels of the respective vehicle axles during deceleration of the vehicle.

It is a further object of this invention to provide a method and apparatus for preventing locking of brakes on the rear axles of decelerating railway vehicles due to loss of traction between the wheels of those axles and the supporting track rails and consequent sliding or slippage between the locked wheels and the track rails.

It is a further object of this invention to provide a method and means for maintaining vehicle platforms in level position during abrupt or intense deceleration, by preventing upward movement of the rear ends of the platforms and consequent downward movement of the forward ends thereof due to change of weight distribution by reason of the momentum of the vehicles.

It is a further object of this invention to provide a method and means for retaining the uniformity of traction between the wheels of the respective axles of a truck and the supporting railway rails during deceleration of the railway vehicle, of which the truck is a part.

It is a further object of this invention to provide a method of braking and means for the accomplishment thereof whereby, upon the application of the wheel and/or track brakes of the vehicle, the platform of the vehicle will be retained in horizontal position and the utmost efficiency of braking will be achieved due to prevention of loss of traction between the wheels of the rear axle or axles of the vehicle upon redistribution of the vehicle weight by reason of the momentum possessed by the vehicle at the time of initial brake application.

These and other objects and advantages will appear from the following description taken in connection with the drawings.

This application is a continuation in part of our application Serial No. 1,602, filed January 14, 1935.

In the drawings:

Figure 1 is a diagrammatic view of a rail vehicle equipped according to the principles of our invention;

Figure 2 is a diagrammatic view of the frame and trucks of a vehicle, partly broken away, equipped according to the principles of our invention;

Figure 3 is a fragmentary diagrammatic view similar to Figure 2, but illustrative of a modified means for mounting track brakes upon the frame of the vehicle;

Figure 4 is a fragmentary bottom plan view of structure illustrated at the left of Figure 3;

Figure 5 is a diagrammatic view of axle speed responsive rheostat means adapted for use in our invention;

Figure 6 is a fragmentary view in elevation, illustrating the details of construction of the truck end track brake shoe mountings shown in Figure 2;

Figure 11 is a view illustrating diagrammatically the application of structure according to Figures 9 and 10, to a rail vehicle, the parts being shown at rest;

Figure 12 is an exaggerated view similar to Figure 11, but illustrating the position of parts taken upon abrupt application of the wheel brakes of the vehicle;

Figure 13 is a view similar to Figure 11, but illustrating the rear frame track brake applied to the rails to apply downward force to the rear of the frame and prevent upward movement thereof to a position such as that illustrated in Figure 11;

Figure 16 is a diagrammatic view, similar to Figure 1, but showing the vehicle equipped with axle speed responsive rheostat means as shown in Figures 5, 14 and 15; and Figure 17 is a diagrammatic view, similar to Figure 2, but illustrating a modified form of mounting for the frame end track brakes of the rail vehicle.

Figure 7:
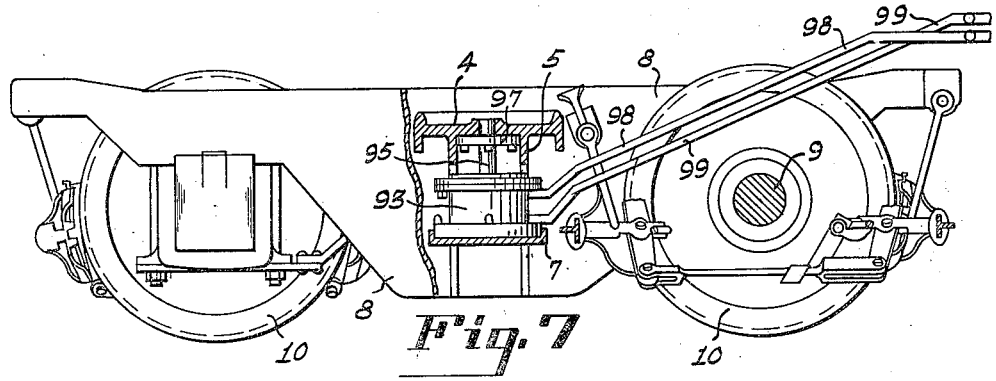
Figure 7 is an elevational view, partly in section, showing the details of a preferred mounting in a conventional truck of control means for the track brakes mounted on the vehicle frame, as shown in Figure 3.

The efficiency of braking achieved in the operation of conventional wheel brakes of track vehicles is dependent, first, upon the coefficient of friction between the brake shoes and the rims of the wheels to which they are applied, and, second, upon traction between the particular wheels and the supporting track rails. The efficiency of braking achieved in the operation of electromagnetic track brakes, however, is independent of the traction between the wheels of the vehicle and the rails. The traction between the vehicle wheels and the track rails is dependent, first, upon the downward force exerted through the respective axles to the wheels thereof, and, secondly, upon the coefficient of friction between the wheels and the supporting track rails.

This coefficient of friction between the respective wheels and supporting rails varies, as is well known, due to weather conditions and according to the condition of the rail surfaces. While it is possible to retain the rail surfaces in satisfactory condition by grinding and replacement, it is impossible to control the weather conditions and, therefore, it is impossible fully to control the variation of the traction between vehicle wheels and supporting rails due to variation of coefficient of friction caused by varying weather conditions. However, due to the fact that this variation in coefficient of friction is generally uniformly distributed between all wheels of a vehicle and/or train of vehicles, this variation may be disregarded in the solution of the problem of providing equal traction between each wheel of a vehicle and the supporting track rails. It is, therefore, possible, by controlling the downward force applied to each axle of a vehicle in such manner that the wheels thereof will be thrust against the rails with the same force as the wheels of other axles of the vehicle, to secure uniform traction between the respective wheels of the vehicle and the supporting rails and thus secure uniform application of wheel braking force throughout the vehicle whereby to prevent locking of wheels by the wheel brakes and consequent loss of traction between the locked wheels and the supporting track rails.

In conventional railway braking practice, upon application of the wheel brakes of the vehicle, when moving at substantial speed, the equality or uniformity of weight distribution with respect to the vehicle axles is destroyed; the momentum of the vehicle will cause transfer to the forward truck of the vehicle of a substantial portion of the weight normally supported by the rear truck of the vehicle. The weight then supported by the rear truck will be less than the weight supported by the forward truck and the downward force exerted through the rear truck to urge the wheels thereof against the track rails will be less than that exerted through the forward truck to force the wheels thereof against the track rails. The traction between the wheels of the rear truck and the supporting track rails will, therefore, be less than the traction between the wheels of the forward truck and the supporting track rails. Within the trucks, this condition will also exist between the respective axles and the traction between the wheels of the rear axle of each truck and the supporting rails will be less than the traction between the wheels of the forward axle of the truck and the supporting track rails.

While this condition, of course, obtains in six-wheel trucks, as well as four-wheel trucks, for the purpose of explaining the principles of this invention, the conditions obtaining in a four-wheel truck alone will be described. In a six-wheel truck, under the above conditions, the traction between the wheels of the rearmost axle and the supporting rails will be least, the traction between the wheels of the central or intermediate axle and the supporting rails will be greater than that between the wheels of the rear axle and the supporting rails, and the traction between the wheels of the forward axle and the supporting rails will be greater than that between the wheels of the intermediate axle and the supporting rails.

It is the purpose of this invention to provide a method and means for retaining uniformity of traction between the respective wheels of each vehicle and the supporting track rails by the application of counterbalancing forces to offset the non-uniformity of downward forces exerted upon the respective axles whereby, by securing equal downward thrust upon each axle of the vehicle, we secure uniform traction between the wheels of each axle and the supporting track rails and whereby equal braking effect is secured, throughout the vehicle, by operation of the conventional wheel brakes of the vehicle in known manner.

In a preferred form of our invention, a pair of track brake shoes is attached at each end of each truck of the vehicle, either as a replacement for or in addition to the pair of track brake shoes attached in conventional manner at the central portion of the truck between the truck axles. Means is provided for varying the intensity of energization of the respective pairs of end track brake shoes upon initial application, as described and illustrated in our copending application Serial No. 1,602, filed January 14, 1935, and preferably for varying the intensity of energization thereof during continued application in proportion to the speed of the vehicle during deceleration in a manner and for a purpose most clearly explained in our copending application Serial No. 131,206 filed March 16, 1937. This means performs the function of retaining uniform condition of traction between the wheels of each truck and the supporting rails.

As the downward force exerted upon each truck depends, during deceleration of the vehicle, upon the proportion of the weight of the vehicle supported by that truck, we have also provided means comprising a pair of track brake shoes attached at the rear of the vehicle frame for exerting a downward force upon the frame at that point in order to counterbalance the excess of downward force applied to the forward truck of the vehicle over the downward force applied to the rear truck of the vehicle. The downward force exerted by these brakes depends upon the intensity of energization thereof and means is provided for controlling the intensity of energization of these brake shoes in the same manner in which the end track brake shoes at the rear of each truck are controlled either concurrently with or independently of the said rear end track brake shoes of each truck. The intensity of energization of these shoes is preferably controlled in proportion to the speed of the decelerating vehicle in the manner and by apparatus most clearly described and illustrated in our copending application Serial No. 131,206, filed March 16, 1937.

As the departure from uniformity of the weight distribution between trucks of the vehicle is proportional to the speed of the vehicle, by means of this apparatus (which comprises a rheostat controlled by governor mechanism attached to and responsive to the speed of an axle of a vehicle) the intensity of energization of these track brake shoes may be satisfactorily controlled in such manner that the downward force exerted upon the respective axles in the vehicle will, at all times, be uniform and the frame of the vehicle and the platform supported thereby will be retained in horizontal position throughout deceleration of the vehicle.

A similar pair of track brake shoes provided with similar control mechanism is preferably attached at the opposite end of the vehicle frame in order that like control of the vehicle may be achieved when the vehicle is traveling in the opposite direction, at which time that end of the vehicle will become the "rear" end. The means for retaining uniform distribution of downward force between the respective trucks of the vehicle may be, of course, utilized or applied to vehicles unequipped with the above-described and hereinafter illustrated truck end track brake shoes, as illustrated in Figures 3, 7, 8, 10, 11 and 12, as will be clearly understood, although it is preferable that the trucks of the vehicle to which this mechanism is applied be equipped with such means as illustrated in Figures 1 and 2.

Referring to the drawings in detail, and in particular to Figure 1, the vehicle therein illustrated comprises the body 1 having its platform supported by the frame 2. The frame 2 is provided with suitable trunnions 3 received in socket plates 4 on bolsters 5, as shown in Figure 3. The bolsters 5 are supported at each side in conventional manner on springs 6 which are suitably supported on means provided therefor in the truck frame, as, for instance, the spring platform 7 shown in Figure 3.

Figure 8:
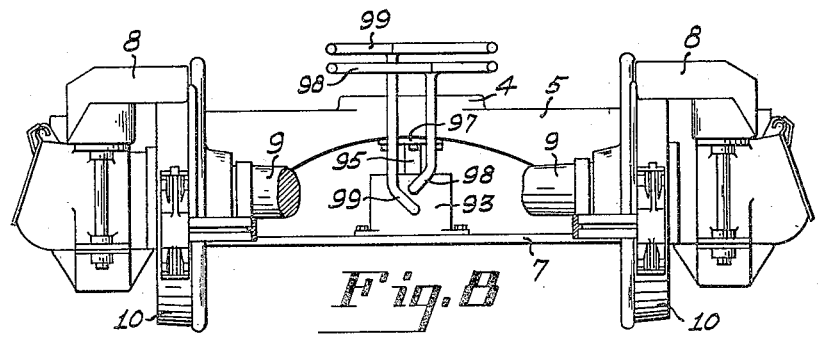
Figure 8 is an end elevational view of the structure shown in Figure 7, one of the axles being broken away in the interest of clearness of disclosure.

As shown in Figure 3, the opposite ends of the spring platform 7 are attached to side frames 8. The axles 9 are rotatably secured to the side frames 8 in conventional manner, as shown in Figures 7 and 8, and have wheels 10 rigidly secured thereto or formed integrally therewith in conventional manner. The weight of each end of the frame 2 is transmitted through trunnion 3 and socket plate 4 to bolster 5 and thence through resilient springs 6 to the spring platform 7, which is rigidly secured to the truck frames. The spring 6, therefore, provide a resilient connection between the bolster and the truck frame, and the compression thereof is directly proportional to the weight supported by the particular bolster 5 considered. The trucks are provided with conventional wheel brakes and brake gear which is operated in known manner. Connected with the brake applying mechanism is a cylinder 11 which is adapted to have fluid pressure introduced therein upon application of the wheel brakes.

Disposed in the cylinder 11 is a piston 12 which is urged toward the left, as seen in Figure 1, by the compression spring 13. A piston rod 14 connects the piston 12 with a switch plate 15 which is adapted normally to be withdrawn from engagement with the cooperating contacts by pressure of the spring 13, but adapted to be engaged with the contacts upon introduction of pressure in the cylinder 11 to overcome the force of the spring 13. A suitable source of power 18, either local or train, is connected by wire 17 to the ground 16 and by wire 19 to the contact 20, with which the switch plate 15 is adapted to cooperate. A second contact 21 is adapted to be engaged by the switch plate 15 when the switch plate engages the contact 20. The main supply wire 22 leads from the contact 21 and is electrically connected through contact 21, switch plate 15, contact 20 and wire 19 to the source of power 18 immediately upon application of the wheel brakes of the vehicle. The main supply wire 22 is provided with an intermediate terminal 23 which is adapted to be connected by the extensible wire 24 to a suitable pendulum switch contact, as will be hereinafter more clearly described.

Each truck, as shown in Figure 1, is provided with a pair of track brakes 25 which are mounted in conventional manner on the truck and which may be, if desired, omitted so far as concerns this invention. At the front end of each truck is mounted, as shown in Figure 2, a pair of front end track brakes 26, each of which is provided with two coils or windings, namely, 27 and 28. The winding 27 is adapted to be energized throughout each brake application to predetermined intensity. The coil or winding 28 is adapted to provide supplemental intensity of energization or to produce a braking force in the brake 26 which is supplemental to the force produced by the energization of the main coil or winding 27. The winding 27 may, therefore, be referred to as the main coil or winding of the brake 26 and the coil or winding 28 may be referred to as the supplemental coil or winding of the brake 26.

At the rear end of each truck, as shown in Figure 2, is mounted a similar pair of track brakes 29 which may be referred to as the rear truck end brakes and each of which is provided with a main coil 30 similar to the coil 27 of the brake 26 and a supplemental coil or winding 31 similar to the supplemental coil or winding 28 of the brake 26. At the ear end of the frame 2 is suitably mounted a pair of rear frame end brakes 32, either in the manner illustrated in Figure 2 or in the manner illustrated in Figures 3 and 7 to 10 and 12. These brakes 32 are provided with a single coil and the desired variation of the intensity of energization thereof is accomplished through operation of suitable rheostat means, as will hereinafter more clearly appear. A pair of similar brakes 33 is mounted at the forward end of the vehicle in the same manner in which the rear frame end brakes 32 are mounted at the rear of the frame 2.

Leading from each end of the main supply wire 22 is a pair of wires 34 each of which is also connected to a cross wire 35 connected between terminals of the main coils or windings 27 and 30 respectively of the brakes 26 and 29. The opposite terminals of these coils or windings are grounded, as shown in Figure 1. Connected between each wire 34 and a terminal of each brake 25 is a wire 36.

The inertia responsive or pendulum switch comprises a pendulum member 38 pivoted at 39 to swing in a vertical fore-and-aft plane and provided at its lower end with a weight member 40 which is suitably electrically insulated from the pendulum member to form an inertia responsive switch contact. A pair of contacts 41 and 42 is so arranged that forward movement of the contact member 40 with respect to the vehicle will cause it to engage the contact 42 to complete the electric circuit from the main supply wire 22, through terminal 23, wire 24 and contact 40 to contact 42. The contact 41 is disposed in the same manner at the rear of the normal position of the contact member 40. The contact 42 is electrically connected by the wire 43 with the wire 44. Each end of the wire 44 is connected to a similar rheostat means 45. Each rheostat means 45 is connected by a pair of wires 46 to one terminal of the auxiliary coil or winding 31 of each rear truck end brake 29. The contact 41 is connected by the wire 47 with the wire 48, at each end of which is disposed a similar rheostat means 49 similar to the rheostat means 45. Each rheostat means 49 is connected by a pair of wires 50 to a terminal of the auxiliary coil or winding 28 of each front truck end brake 26, the other terminal of which coil or winding 28 is grounded, as shown in Figure 1.

The operation of the above mechanism is as follows. When the vehicle is traveling in the direction of the arrow, upon application of the wheel brakes, the contacts 20 and 21 are engaged and bridged by the switch plate 15, whereby to connect the main supply wire 22 with the source of power 18. The inertia of the gravity responsive or pendulum member 40 will cause it to swing forwardly and engage the contact 42, whereby to connect the wire 43 with the main supply wire 22. The flow of current will continue from the wire 43 to wire 44 and thus through each rheostat means 45 and each wire 46 to the auxiliary coil or winding 31 of each rear truck end brake 29. This will cause energization of the auxiliary coil or winding 31 of each rear truck end brake 29, the main coil or winding 30 of which was energized along with the main coil or winding 27 of the front truck end brakes 26 immediately upon operation of the switch plate 15 to connect the main supply wire 22 with the source of power 18.

Immediately upon bridging of the contacts 20 and 21 by the switch plate 15, current flows from the main supply wire 22 through each wire 34, through cross wires 35 and through wires 36 to the main coils or windings 27 and 30 of the respective truck end brakes and also to the coils of the brakes 25. Thus, immediately upon application of the wheel brakes, the brakes 25 along with brakes 26 and 29 are energized to predetermined intensity to cause application thereof and then, after engagement of the inertia responsive switch contact member 40 with the contact 42, the auxiliary coils or windings 31 of the respective rear truck end brakes 29 are energized to increase the intensity of energization of the brakes 29. The amount of increase of intensity of energization by energization of the coil 31 will depend upon the settings of the respective rheostats 45 because, as will be clearly understood, by increasing the resistance inserted between wires 44 and 46, the intensity of energization of the coils 31, upon operation of the inertia responsive switch means, will be decreased.

When the vehicle is traveling in the direction opposite that indicated by the arrow, the brake coils 30 and 27, as well as the coils of brakes 25, will be energized to predetermined intensity immediately upon application of the wheel brakes, as above described. Then, after operation of the inertia responsive switch means to connect the energized main supply wire 22, through terminal 23, wire 24, contact member 40 and contact 41, through wire 47 and wires 50 to coils 28, the auxiliary coils 28 of the front truck end brakes 26 will be energized a predetermined amount, depending upon the settings of the rheostat means 49. It will thus be seen that the mechanism is reversible, i. e., when the vehicle travels in the direction indicated by the arrow, the brakes 26 are the front truck end brakes, and the brakes 29 are the rear truck end brakes; while, when the vehicle is traveling in the opposite direction, the brakes 26 become the rear truck end brakes, and the brakes 29 become the front truck end brakes.

The coils of the rear frame end brakes 32 each have one terminal grounded, as shown in Figure 1, and the other terminal connected by a wire 51 to the switch blade 52. The switch having the switch blade 52 is designated 53 and is provided with three contacts. The left contact, designated 55, is connected by wire 54 with one wire 46. The intermediate contact 56 is dead and the right contact 57 is connected to the rheostat means 58 which is connected by wire 59 to a wire 34. The front frame end brakes 33 each have one terminal grounded, as shown in Figure 1, and the other terminal connected by a wire 60 to the switch blade 61 of the switch 62. The switch 62, like the switch 53, is provided with three contacts. The left contact 64 is connected by wire 63 with a wire 50. The intermediate contact 65 is dead and the right hand contact 66 is connected to rheostat means 67 which is connected by wire 68 to a wire 34.

By means of the switches 53 and 62, the operations of the front and rear frame end brakes may be varied. For instance, the energization of the rear frame end brakes may be accomplished simultaneously with the energization of the main coils 27 and 30 of the track brakes 26 and 29, or the energization of coils of rear frame end brakes 32 may be accomplished simultaneously with the energization of the auxiliary coils 31 of the rear truck end brakes 29. In the former cases, switches 52 and 53 will be placed in the respective positions shown in Figure 1, whereby the coils of front frame end brakes 33 will be disconnected from any source of power. The wire 51 will be connected through the switch blade 52, contact 57, rheostat means 58, wire 59, and a portion of wire 34 to the main supply wire 22.

Immediately upon energization of the main supply wire 22 through application of the wheel brakes and operation of the switch means, current will flow from the main supply wire 22 through a portion of wire 34 through wire 59 and rheostat means 58 to contact 57, and thence through switch blade 52 and wires 51 to the coils of the rear frame end brakes 32. The intensity of energization of these brakes will depend upon the setting of the rheostat 58. Due to the connection of the wire 60 with the dead contact 65 of switch 62, no energization of the front frame end brakes will occur.

The second mode of operation, wherein energization of the coils of the rear frame end brakes 32, after operation of the gravity responsive switch means and simultaneously with the energization of the auxiliary windings 31 of the rear truck end brakes 29, may be accomplished by connecting the switch blade 52 of the switch 53 with the contact 55 of that switch, whereby to connect the coils of brakes 32 through wires 51, switch blade 52, contact 55 and wire 54 to wire 46. Energization of the wire 46 is dependent upon operation of the gravity responsive switch. Simultaneously, with energization of the wires 46 through operation of the gravity responsive switch, the coils 31 of each brake 29 are energized simultaneously with energization of the coils of the rear frame end brakes 32. In this latter mode of operation, the switch blade 61 of the switch 62 is preferably engaged with the contact 64 of that switch and, when so engaged, when the vehicle is traveling opposite to the direction indicated by the arrow in Figure 1, engagement of the gravity responsive switch member 49 with the contact 41 will cause the coils of the brakes 33 to be energized simultaneously with the energization of the supplemental coils 28 of the brakes 26 which are then the rear frame end brakes.

When it is desired that the energization of the coils of the brakes 33 be accomplished simultaneously with the application of the wheel brakes, the switch blade 61 is engaged with the contact 66 and the switch blade 52 is engaged with the dead contact 56. While a pair of similar rheostats 45 is shown in Figure 1, it is, of course, to be understood that a single rheostat may be substituted therefor. Likewise, a single rheostat may be substituted for the pair of similar rheostats 49. These rheostats which are illustrated diagrammatically, as adjustable, may be of any desired type, either manually or mechanically operated; and it is preferred, in certain cases, that adjustment thereof be achieved in such manner that the intensity of energization of the auxiliary coils of the truck end brakes and the coils of the frame end brakes be proportional to the speed or velocity of the vehicle at the time of application and also throughout the operation thereof in the deceleration of the vehicle after initial application of these brakes.

Figure 14:
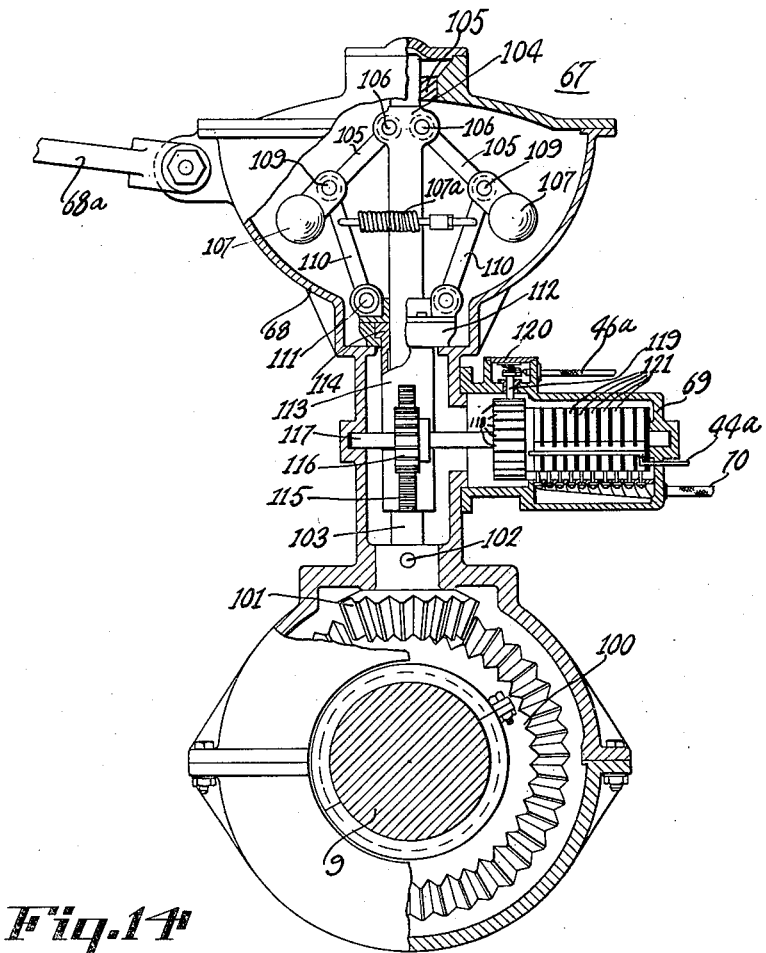
Figure 14 is an enlarged view, in section, of the rheostat means illustrated in Figure 5.
Figure 15:
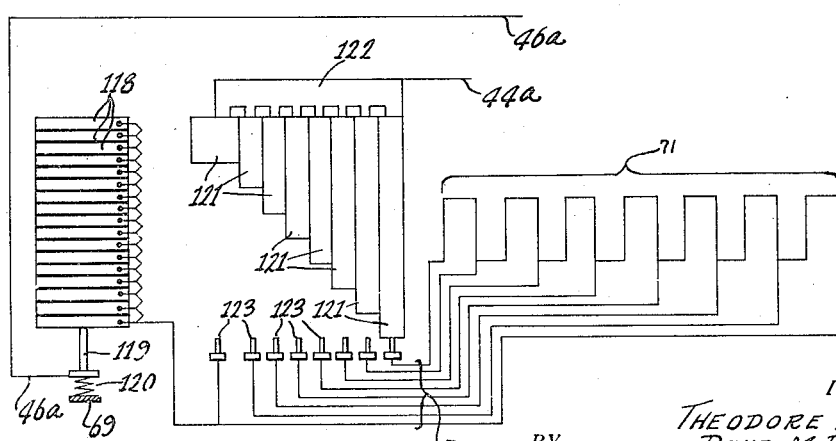
Figure 15 is a diagrammatic view illustrating the arrangement of the resistance elements of the rheostat means illustrated in Figures 5 and 14.

A preferred form of automatic rheostat mechanism, responsive to vehicle axle speed, is illustrated in Figures 5, 14 and 15 and is illustrated as substituted for the respective rheostats 45 and 49 in diagrammatic Figure 16. This rheostat means is generally designated 67 and comprises a governor casing 68 supported upon a rotating axle 9 of the vehicle (preferably the rear axle) and attached by means of the arm 68a to any suitable part of the truck. The arm 68a is pivotally attached at one end to any suitable part of the truck and pivotally secured at the other end to the governor casing 68.

Rigidly secured to the governor casing 68 is the armature casing 69. The governor casing 68 contains centrifugal governor means which is geared to the axle 9, as is hereinafter more clearly described, and this centrifugal governor means is operatively connected to a shaft which is rigid with an armature supported in the armature casing 69. The armature is so constructed that collector means at opposite sides thereof may be connected by wires 46a to wires 46 (or wires 50a to wires 50) and by wires 44a to wires 44 (or wires 47a to wires 47) respectively, as shown in Figure 16, in such manner that the automatic rheostat means 67 will be substituted for the respective rheostats 45 and 49. The armature has suitable collector means thereof connected through cable 70 to the taps of a tapped resistance element 71 in such manner that rotation of the armature responsive to speed of the axle 9 will cause varying resistance values to be inserted between the respective wires 44a and 46a (or 47a and 50a).

As shown in Figure 16, the wire 46a of the rheostat means 67 at the rear of the vehicle is connected to the wire 46 at the left or brake side of the lefthand rheostat 45 and also to one terminal of a two-way switch 45a inserted in the wire 46 at the right or brake side of the righthand rheostat 45. The wire 44a of the lefthand rheostat means 67 is connected to one terminal of a two-way switch 45a provided in the wire 44 at the righthand side of the lefthand rheostat 45.

As shown in Figure 16, the switches 45a are so positioned as to connect the wire 44a to the wire 44 which is connected to the wire 43 having the momentum switch contact 42 thereon. The righthand switch 45a connects the righthand wire 46 to the wire 46a which also leads to the rheostat and to the lefthand wire 46. The switch 53 is placed in such position as to connect the wires 51 with the contact 55 (which is optional), and which practice is followed when it is desired to place it and the left rear end track brake 32 under the control of the rheostat 67. When this connection is made and the vehicle is traveling to the right, as seen in Figure 16, or in the direction of the arrow indicated therein, the control of energization of the respective track brake coils, formerly controlled by the rheostats 45, will be controlled entirely by the rheostat means 67.

When the vehicle is traveling to the right, or in the direction indicated by the arrow in Figure 16, the righthand control switch 62 is placed in intermediate position with the switch blade engaged with the intermediate or dead contact 65. The reason for this connection is explained above. The wire 50a of the righthand rheostat means 67 is connected to one side of each of the switch means 49a inserted between the respective rheostats 49 and the respective wires 50. When these switches 49a are positioned, as shown in Figure 16, the rheostats 49 are removed from the brake energization control circuits, and the righthand automatic or wheel responsive rheostat means 67 is substituted for both of these rheostats 49.

In brief, when the vehicle is traveling to the right, as indicated in Figure 16, the switch blade of the lefthand switch 53 is placed on the contact 55 and the blade of the righthand switch 62 is placed on contact 65 and conversely when the vehicle is traveling to the left, the blade of the lefthand switch 53 is placed on contact 56 and the blade of the righthand switch 62 is placed on the contact 66. When these connections are made, the respective speed responsive rheostats 67 will control the coils in the truck and brakes 26, 26, 29, 29 and also the brakes 32 during rightward travel and brakes 33 during leftward travel.

By changing the position of the switches 45a and 49a, the wire 44 may be disconnected from wires 44a and connected again to rheostats 45, and by changing the positions of the switches 49a, the wires 50 may be disconnected from the wires 50a and connected with the rheostats 49 so as to place the circuit in the condition illustrated in Figure 1, or to substitute the respective rheostats 45 and 49 for the automatic rheostat means 67. It is, of course, to be understood that the switches 45a and 49a may be omitted and the connections illustrated in Figure 16 may be made permanent with the omission of the respective rheostats 45 and 49 and the connections thereof which are not utilized in the operative circuit illustrated in Figure 16.

The details of the automatic or speed responsive rheostat means illustrated in Figures 5, 14 and 15 are as follows. The split gear 100 is bolted to the desired axle 9, as shown in Figure 14, and is enclosed in the lower part of the governor casing 68. This gear is in mesh with the pinion 101 which is supported in vertical position in the governor casing and which is secured by means of the pin 102 to the vertical shaft 103. The vertical shaft 103 is provided with a head portion 104 adjacent its upper end, which upper end is rotatably supported in the bearing 105 which is rigid with the cap portion of the governor casing 68.

Pivotally supported at opposite sides of the head portion 104 on pins 106 is a pair of levers 105, each having a weight member 107 at its outer end, and to each of which is pivotally connected by means of transverse pins 109 a link 110. The links 110 are each pivotally connected at their lower ends by means of a pin 111 to a collar member 112 and which is rotatable with respect to the enlarged head portion 114 of a sleeve 113 which is supported for axial movement on the vertical shaft 103. The sleeve 113 is provided with a rack 115 which rack engages the gear 116 which is rigidly secured to the armature shaft 117.

The armature shaft 117 is rotatably supported in suitable manner at one end by a portion of the governor casing 68 and, at the other end, by the end portion of the armature casing 69, as shown in Figure 14. The armature which is rigidly supported by the armature shaft 117 comprises a plurality of armature plates 118 which are electrically connected together, as shown in Figure 14, but which are suitably insulated from the armature shaft 117. The annular ring armature formed by the armature plates 118 is engaged by the brush member 119 which is normally biased toward the plates 118 by means of the spring 120. The brush 119 is adapted for connection to a wire 46a (or a wire 50a) as pointed out above.

Also supported upon the armature 117 is a plurality of slip ring segments 121 which are axially spaced from one another and suitably insulated from one another and from the shaft 117 and plates 118. These segments are engaged by a collector member 122 which is suitably supported in the armature casing 69 and adapted to be electrically connected to a wire 44a (or a wire 47a), as described above. Each segment 121 is adapted to engage a brush member 123 when properly positioned with respect thereto, and each brush member 123 is connected by means of one wire of the cable 70 to a suitable tap of the resistance element 71, as shown in Figure 15. As will thus most clearly appear, rotation of the armature shaft 117 will cause varying resistance values to be included between the wires 44a and 46a (or 47a and 50a).

This rotation is secured through rotation of the vertical shaft 103 which causes the weight members 107 of the governor to move outwardly and upwardly against tension of the spring 107a disposed therebetween, and this, of course, moves the collar 112 axially upwardly to cause upward axial movement of the sleeve 113 and its rack 115 which engages the gear 116 rigidly attached to the armature shaft 117.

It is, of course, to be understood that the amount of resistance between the respective taps of the tapped resistance element 71 may be varied at will so that any desirable range may be secured through operation of the axle speed responsive rheostat. For instance, the taps of the resistance may be so arranged that the amount of resistance inserted at a given time between wires 44 and 46 will vary inversely with the square of the axle speed and, therefore, inversely with respect to the square of the velocity of the vehicle which is directly proportional to the axle speed. Therefore, the intensity of energization of the respective coils of the truck end brakes and frame end brakes may be retained, at all times, proportional to the square of the vehicle speed or velocity. It is likewise to be understood that such axle speed responsive rheostat mechanism may be substituted for the rheostats 58 and 67 (Fig. 1); and, while a single mechanism of this type may be substituted, if desired, for both rheostats 58 and 67, it is preferred that the axle speed responsive means for controlling the intensity of energization of the brakes 33 be supported by and responsive to the speed of the righthand axle, as shown in Figure 1, and the mechanism utilized to control the intensity of energization of the brakes 32 be supported by and responsive to the speed of the lefthand axle, as seen in Figure 1.

As shown in Figure 2, the conventional truck track brakes 25, which may be omitted, if desired, are mounted in conventional manner between the wheels of the respective trucks, and due to the fact that they are centrally located with respect to the truck, they exert substantially equal downward force with respect to the axles 9 of the truck at all times, although there is a slight and substantially unappreciable corrective force exerted thereby. As will be most clearly understood, when the wheel brakes are applied to the wheels 10 of the vehicle shown in Figure 2, the mass of the truck, by reason of its momentum, will tend to continue forward motion and will cause destruction of the balance between the downward force exerted upon the forward axle and the downward force exerted upon the rear axle. This momentum is kinetic energy, the formula for which is $$K.E. = \frac{m.v^2}{2} = \frac{w.v^2}{2g}$$

The equal distribution of the weight between the axles of each truck will likewise be disturbed and the forward axle of the truck will then carry a greater proportion of the weight of the truck than is carried by the rear axle of the truck. The inequality of downward force, as between the axles, will be directly proportional to the momentum at the time of wheel brake application; and, therefore, as in the above formula, the quantities, $w$, $m$ and $g$, are constants, and the momentum varies directly with the square of the speed or velocity of the vehicle. It, therefore, follows that the difference in downward force exerted by the mass of the truck upon the respective axles also varies directly with the square of the speed or velocity of the truck.

Therefore, as it is desired to provide for counterbalancing the excess of downward force on the front axle over the downward force on the rear axle, it is proposed that, upon application of the brakes 26 and 29 of the vehicle, the downward force exerted by the rear truck end brakes 29 may be made greater than that exerted by the front truck end brakes 26 in order that such a balance of downward force upon the axles may be achieved that the downward force exerted upon the rear axle 9 of the truck be always equal to the downward force exerted on the forward axle of the truck so that the traction between the wheels thereof shall remain uniform during deceleration of the truck. Therefore, as this increase of downward force exerted upon the rear end of the truck by the brakes 29 over the downward force exerted at the forward end of the truck by the brakes 26 depends solely upon the intensity of energization of the coils 31 of the brakes 29, it is proposed that this excess of downward force be retained at all times directly proportional to the speed of the truck.

As the speed of the truck is directly proportional to the speed of the axle thereof, by the use of the axle speed responsive rheostat mechanism illustrated in Figure 5, for controlling the intensity of energization of the coils 31, this desired result may be automatically achieved.

In Figure 2, the desired counterbalancing of distribution of truck weight due the equality of distribution of truck weight due to momentum is diagrammatically illustrated.

As shown in the diagram in Figure 2, O designates a point centrally disposed with respect to the truck upon which the weight W would be concentrated when the vehicle was at rest; and A designates a similarly disposed point in a vertical plane passing through the rear axle of the truck; while B designates a similar point in a vertical plane passing through the forward axle of the truck. C designates a point disposed centrally with respect to the truck in a plane passing through the centers of downward force applied by the brakes 29 of the truck. D represents a similar point in a vertical plane including the centers of downward force applied by the brakes 26. Where the vehicle was at rest, the brakes 26 and 29 would be de-energized and no downward forces would be applied at C and D. The weight W would act downwardly at point O which is equidistant from the points A and B, and, therefore, equal downward force would be applied at points A and B, and the weight supported by the rear axle would be equal to the weight supported by the forward axle, or in other words, the weight supported by each axle would be equal $$\frac{W}{2}$$

Where the vehicle is traveling to the right or in the direction of the arrow, shown in Figure 1, upon application of the brakes, the momentum, which is proportional to the square of the velocity, would cause the point of downward application of the weight of the vehicle to move forward fro mthe point O to the point G. The weight will then be unequally distributed with respect to the axles, the weight (WA) applied downwardly to the rear axle being less than that applied downwardly at the front axle. In other words, WA would be less than WB. For the purpose of counterbalancing this unequal distribution of weight, it is proposed that additional downward force be applied at the point C to counterbalance the quantity represented by WB minus WA. Due to the fact that the downward force of the brakes 25 is centrally applied with respect to the trucks, and due also to the fact that these brakes may be omitted, so far as concerns this invention, the downward forces applied thereby are, therefore, disregarded in the diagram.

The vector quantities, F29 and F26, represent the downward forces desired to be applied by the brakes 29 and 26 respectively, in order to accomplish the above counterbalancing. The quantity F26 equals the quantity F27 which represents the downward force applied through brake 26 by energization of the coil 27 thereof, while the quantity F29 represents the quantity F30 plus the quantity F31. The quantity F30 represents the downward force applied through the brake 29 upon energization of the coil 30, while the quantity F31 represents the downward force applied by the brake 29 through energization of the coil 31 thereof.

The quantity WB minus WA is directly proportional to the distance OG and it is, therefore, desirable that the quantity F31 be proportional also to the distance OG. The distance OG is directly proportional to the momentum at the time of brake application which is represented by the formula:

$$K.E. = \frac{W.v^2}{2g}$$

As W and g are always constant, the distance OG, therefore, varies directly with respect to $v^2$. It is, therefore, possible, by controlling the energization of the coil 31 of the brake 29, to retain the quantity F31 always directly proportional to the square of the velocity of the vehicle or the quantity $v^2$. This is preferably accomplished, as above described, by the mechanism illustrated in Figure 5. Thus, by retaining the quantity F31 in direct proportion to the square of the velocity of the vehicle, both at the time of initial energization of the coil 31 and throughout the energization thereof, the quantity WB minus WA is constantly counterbalanced by the quantity F31, and the weight supported by the forward and rear axles thus constantly retained equal.

At any time during the application of the track brakes with the coil 31 of the brake 29 energized, the forces WB minus WA and F29 alone need be considered, because the force WB equals WA plus WB minus WA, and, as F30 equals F26, F29 equals F26 plus F31 minus F26. Therefore, the quantities WB minus WA and F31 alone may be considered with the force WB minus WA acting at B and the force F31 acting at C. The formula will then be as follows:

Resolving moments about A $$-F31.(AC) + (WB - WA).AB = 0$$
$$\therefore F31.(AC) = (WB - WA).AB$$
$$\text{and} \quad F31 = \frac{(WB - WA).AB}{AC}$$

Therefore, as the quantity WB minus WA increases with increase in velocity and varies directly with the square of the velocity, where the quantity F31 is so chosen as to meet the requirements of the above formula and where the energization of the coil 31 at a rate varying inversely as the square of the velocity, upon initial energization of the coil 31, the force WB minus WA will be balanced by the force F31, and this balance will be retained throughout application of the track brakes during deceleration of the truck. It is merely necessary, in order that the above control of the energization of the coils 31 be achieved, that the taps of the resistance element 71 be properly chosen to cause the correct amount of resistance to be inserted in the energizing circuit of the coil 31 throughout its energization.

As above explained, the equality of weight distribution between the respective trucks of the vehicle will also be disturbed upon application of the wheel brakes, and as it is, therefore, desirable that this inequality be overcome, or prevented from occurring, we have provided the frame end brakes 32 at the rear end of the frame, 2, and the front frame end brakes 33 at the front end of the frame, which are adapted to be alternately operated at the then rear end of the vehicle upon brake application.

As diagrammatically shown in Figure 2, the shoes of the brakes 32 and 33 are supported by extremely strong and heavy coil springs 72, each having one end suitably rigidly attached to the top of a shoe and the other end suitably rigidly attached to the underside of the frame 2. Upon energization of the coils of the brakes 32 simultaneously with energization of the coils 27 and 30 of the respective brakes 26 and 29 of the vehicle or simultaneously with energization of the coils 31 thereof, the shoe of the brakes 32 will be applied under tension exerted by the supporting spring 72. This exerts a downward force at the rear end of the frame 2, which force is directly proportional at all times to the effective length of the spring 72 and which is vectorarily represented Z, and which is adapted both to prevent or overcome upward movement of the rear end of the frame due to momentum and redistribution thereby of the weight of the vehicles, with respect to the truck, and also to offset the redistribution of weight in order that the force exerted downwardly by the frame and supported parts upon the respective trucks of the vehicle shall be equal.

As shown in Figure 2, the vector X designates the downward force applied to the rear truck upon brake application where the vehicle is traveling at a predetermined speed, while Y represents the downward force applied to the forward truck of the vehicle. The quantity Y minus X would equal the excess in weight supported by the forward truck over that supported by the rear truck. Because it is desired, as pointed out above, that equal downward force be applied to each truck in order that uniform traction between wheels and rails be secured throughout the vehicle, the downward force Z is applied in order to compensate for the excess force (Y minus X) exerted on the forward truck.

The intensity of the downward force Z depends upon the strength of the spring 72 which is predetermined, and also upon the displacement between the top of the shoe 32 and the under surface of the rear of the frame 2 when the vehicle is stopped, whereupon the rear end of the frame is raised by the momentum. The greater the rise of the rear end of the platform, the greater the value of the downward force Z due to the fact that spring 72 reacts according to Hooke's law. It is possible, when such mounting of the shoes of the frame end brakes is utilized, that the intensity of energization of the coils of these brake shoes remain constant during application and be of such value as to retain the shoe in position against the rail despite th ultimate pull exerted between the shoe and the frame 2 by the ultimate extension of the spring 72. This may be accomplished by placing the switch blade 52 in engagement with the contact 57, as shown in Figure 1, and the switch blade 61 in engagement with the contact 65, as therein shown. The rheostat 58 may be omitted, because the ultimate intensity of energization of the coils of shoes 32 is desired. As shown in our copending application Serial No. 1,602 filed January 14, 1935, the shoes 27 and 29 of the respective trucks may, of course, be supported in the same manner.

The brakes 32 and 33 may likewise be mounted on downwardly extending extensions hung from the frame 2, in the frame in which the brakes 25, 26 and 29 are mounted on the truck frames, as shown in Figure 2 and as diagrammatically shown at the left of Figure 12. The detail of this mounting means is shown in Figure 6. The mountings each comprise a stationary bracket 73 rigidly secured to the underside of the truck frame and is provided with a pair of spaced downwardly extending arms having horizontal bores therein, through which extend the supporting pins 74, which pivotally support the swivel bracket 75. Each upper corner of the swivel bracket or bracket plate 75 is turned over and apertured for a purpose which will hereinafter appear. Each lower corner of the bracket plate 75 is provided with a vertically disposed longitudinal slot 77 adapted to serve a purpose likewise hereinafter more clearly described. The pivotal connection of members 73 and 75 may, of course, be omitted.

Extending through the aperture in each turned over portion 76 is a vertically disposed sliding rod 78 which is rigidly attached at its lower end to a bracket 79 which is bolted at 80 to the brake shoe 29 and which is provided with a horizontal check pin 81 adapted for limited vertical sliding movement in each slot 77. Disposed about the upper end of the rod 78 is a compression spring 82 having its upper end in engagement with the underside of the turned over portion 76 of the bracket plate 75 and having its lower end in engagement with an adjustable stop member 83 screw-threaded on the rod 78 for adjustment axially thereof. Below the stop member 83 is a second compression spring 82 having its upper end in engagement with the underside of the stop member 83 and its lower end secured against downward movement by a shoulder on the swivel bracket or bracket plate 75.

It will thus be seen that, upon energization of the coil of the shoe 29, the springs 82 will be overcome and the shoe 29 will move downwardly until it is closely disposed to the rail and is prevented from further downward movement by engagement of the pin 81 on each rod 78 with the cooperating slot 77 in the swivel bracket 75.

It is, of course, to be understood that, when the brake is in both positions illustrated in Figures 2 and 6, the shoe is so closely disposed with respect to the rail as to have the rail within the magnetic field thereof. As it is often desired that the brake shoes be removed a substantial distance from the rail when not in operation, means may be provided for further removing them from the rails in order to prevent accidental contact between rail and shoe by normally swinging the swivel bracket or bracket plate 75 and supported parts inwardly, transversely of the rail. The shoes will then be supported between, above, and spaced from the respective rails. Various known mechanisms are suitable for and may be utilized for this purpose. This means likewise includes means whereby the swivel brackets and supported shoes may be swung outwardly so that the shoes are disposed above the rail, as shown in Figure 6. As this means is well known in the art and is not, per se, a part of this invention, further description thereof is, therefore, deemed unnecessary.

Where the shoes 32 and 33 are supported in the same manner as the shoes 26 and 29, as shown in Figure 2, it is desirable that the downward force applied by the brakes (which are, in effect, rigidly attached to the frame after the relative downward movement between the swivel bracket 75 and the shoe has been prevented by engagement of the pins 81 with the lower ends of the slots 77) be varied according to the speed or velocity of the vehicle. For this purpose, the switch blade 52 is placed in engagement with the contact 55 and the switch blade 65 is placed in engagement with the contact 64 in such manner that energization of the coil of brake 32 will occur simultaneously with energization of the auxiliary coil 31 of brake 29 and, likewise, in order that the coils of brakes 33 may be energized simultaneously with energization of the supplemental coils 28 when the vehicle is traveling in a direction opposite that denoted by the arrow in Figure 1. The rheostats 45 provide common control for the coils of brakes 32 as well as the auxiliary coils 31 of brakes 29; and, as these rheostats are preferably made of the type illustrated in Figures 5, 14, 15 and 16 and, therefore, directly responsive to the axle speed of the vehicle, the intensity of energization of the coils of the brakes 32 is, therefore, at all times, proportional to the speed or velocity of the vehicle where the frame end brakes 32 are suspended from the frame in the manner illustrated in Figs. 6 and 12.

As the rheostats are so adjusted that the resistance inserted by them in the brake energizing circuit is inversely proportional to the square of the velocity, the intensity of energization of the coils of brakes 32, therefore, will be directly proportional to the square of the velocity. As the momentum of the vehicle is also directly proportional to the square of the velocity, the downward force exerted by the brakes 32, which vary directly with the intensity of energization thereof, is also proportional to the momentum of the vehicle at any time. As the quantity, Y minus X, is also, at all times, directly proportional to the momentum and to the square of the velocity, the downward force Z applied by the brakes 32 is, therefore, directly proportional to the quantity, Y minus X, which equals that inequality of weight distribution between the trucks of the vehicle, which must be counterbalanced by the quantity Z.

As the balance of distribution of weight is thus constantly retained in the vehicle, the consequent inclination of the frame and supported parts of the vehicle downwardly toward the front and upwardly toward the rear end is thus totally prevented. It is thus to be seen that by the practice of the principles of this invention, full equality of weight distribution is achieved; uniformity of wheel traction is secured throughout the vehicle; and the platform of the vehicle is retained in horizontal position.

A third means for supporting the frame end of track brakes on the frame of the vehicle is shown in Figures 3, 4 and 7 to 11 inclusive and 13, the showing in Figures 3, 4 and 9 to 11 and 13 being diagrammatic. As shown in Figs. 3, 4, 9 and 10, this means comprises a recessed extension 85, preferably rigidly attached to the top of the track brake shoe 32, as by means of bolts 86 (Figure 9), and provided at its upper end with an aperture 87, in which the brake support rod 88 is slidable. The recessed extension 85 is retained on the lower end of the rod 88 by means of a head 89 having a compression spring 90 disposed about the rod 88 and between the upper surface of the head 89 and the upper end of the recess in the extension 85. The upper end of the rod 88 is provided with a rigidly attached piston 91 which is supported for vertical slidable movement in the cylinder 92, which is rigidly attached to the underside of each end of the frame 2. Each shoe of each brake 32 and 33 is supported in like manner.

Figure 9:
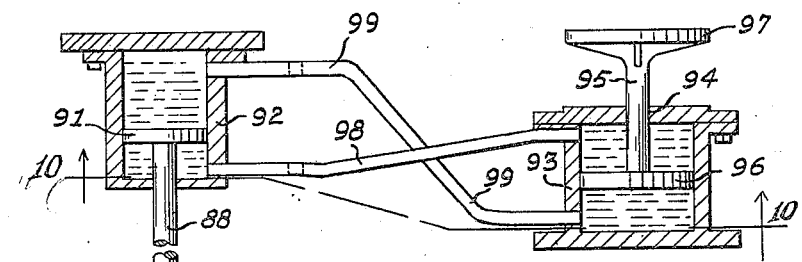
Figure 9 is a diagrammatic view, partly in section, illustrating the vehicle frame track brake mounting means and control mechanism illustrated in Figures 3, 7 and 8.

A cylinder 93 is supported by and rigidly attached to the spring platform 7 of each truck of the vehicle and is closed at its lower end and provided at its upper end with an aperture 94 adapted to slidably support a piston rod 95 having a piston 96 rigidly attached to its lower end and a head bracket 97 rigidly attached to its upper end and also adapted to be secured, by bolts or other suitable means, to the bolster of the truck. The lower end of each cylinder 92 is connected, by means of the Y-shaped conduit 98, with the upper end of the cylinder 93. The upper end of each cylinder 92 is connected by the Y-shaped conduit 99 with the lower end of the master cylinder 93. Any suitable means may be provided for varying the length of the brake support rods 88 or the piston rod 95 to adjust the position of the brakes 32 and 33 when desired. The cylinders 92 and 93 and also the conduits 98 and 99 are filled with fluid, as shown in Figures 3 and 9.

Immediately upon application of the brakes 32, the spring 90 is overbalanced and the cooperation of the head 89 with the upper end of the recess in the extension 85 prevents further relative movement between the brake support rod 88 and the shoe 32. Any upward movement of the cylinder 92 (which is rigidly attached to the rear end of the platform 2) will cause the fluid in the cylinder 92 below the piston 91 to be placed under pressure which is transmitted through conduit 98 to the cylinder 93 above the piston 96.

The intensity of energization of the brake 32 is such as to retain it, at all times, in applied position with respect to the rail either in contact therewith or adjacent but slightly spaced therefrom as shown in Figure 12. The shoes of the brakes 32 will, therefore, by means of compression of the fluid below the piston 91, cause a downward force to be exerted to the rear of the frame 2 through downward force applied to cylinders 92, and simultaneously apply downward pressure to the piston 96 which transmits this pressure through piston rod 95 and head 96 to the bolster 5 of the truck and thus partially relieves the bolster from the upward thrust exerted thereon by the springs 6 of the truck. This apparatus, therefore, performs the multiple functions of reducing or counterbalancing the upward pressure of the springs 6 upon the bolster 5 of the rear truck, while at the same time applying downward force directly at each rear corner (in effect) of the frame through downward force applied to the cylinders 92. Any upward movement of the rear end of the frame will tend to shorten the effective distance between the lower end of the cylinder 92 and the upper side of the shoe 32, because such movement will increase the pressure exerted upon the fluid in the cylinder 92 below the piston 91 and also, by permitting upward movement of the bolster of the rear truck, permit the bolster to increase the pressure on the fluid in the cylinder 93 above the piston 96, which body of fluid communicates through conduit 98 with the fluid in the cylinder 92 below the piston 91.

Figure 10:
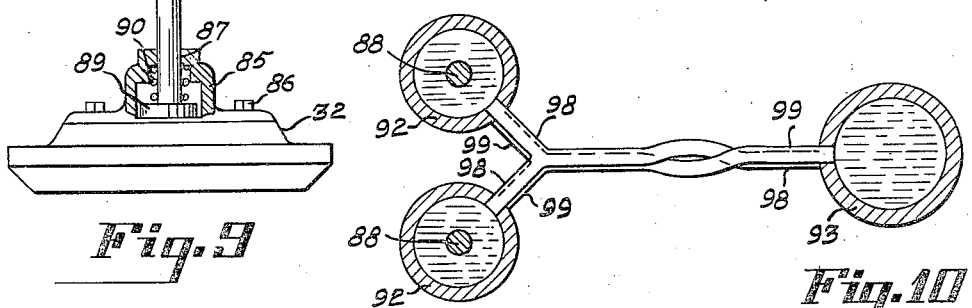
Figure 10 is a section taken on the line 10—10 of Figure 9.

The diameters of the piston rods 95 and brake support rods 88 and the diameters of the pistons 91 and 96 are so chosen that the sum of the areas of the effective lower piston surfaces of each pair of pistons 91 is equal to the area of the effective piston surface of the upper surface of each corresponding piston 96. Likewise, the sum of the areas of the upper surfaces of each pair of pistons 91 is equal to the area of the lower surface of the piston 96 (Figs. 9 and 10). In Figures 7 and 8, the details of a known form of truck are illustrated with this apparatus applied thereto in a manner which will be clearly understood from the above description.

It is, of course, to be understood that the rods 88 may be rigidly secured to the under surface of the frame 2 or suitable extensions thereof, and the cylinder 92, piston 91 and other fluid mechanism may be omitted as shown in Figure 17, if desired, although it is preferred that such mechanism be utilized because the efficiency of operation of this apparatus is much increased by relieving the springs of the rear truck, while applying downward force to the rear end of the frame of the vehicle in order to offset the shifting of weight from the rear truck to the forward truck of the vehicle, as illustrated in Figure 12.

As diagrammatically shown in Figure 11, when the vehicle is at rest or traveling at a uniform speed, the center of gravity of the vehicle is at its center and the weight is equally distributed from end to end of the frame of the vehicle, whereby substantially one-half of the weight is supported by the bolster 5 of the rear truck and an equal amount by the bolster 5 of the forward truck. As shown in that figure, the truck end brakes 32 and 33 are, of course, de-energized.

As shown in Figure 12, where the brakes 33 have been omitted, upon application of the wheel brakes of the vehicle, the weight distribution is disturbed and the center of gravity moves forward from the line 0—0 to the line 0'—0'. The weight distribution is non-uniform with respect to the trucks, as shown by the diagram. The weight supported by the rear truck is represented by the vector quantity W1, while that supported by the forward truck is represented by the vector quantity W2. The weight diagram which was formerly, as shown in Figure 1, a rectangle having corners A, B, C, D, has become a trapezoid having the corners A', C, B', D. Therefore, in order to restore the uniformity of weight distribution so that equal amounts of weight will be supported by the respective trucks of the vehicle, downward force is applied substantially at the point A, through the brake 32 alone (Fig. 12) or with its associated fluid mechanism (Figs. 11 and 13), to offset the difference in supported weights between the respective trucks or the quantity W2 minus W1. This force, as applied, will offset the inequality of weight distribution and restore the force conditions in such manner that the forces supported by the forward and rear trucks of the vehicle will be equal, as shown in Figure 13.

A particularly notable feature of the apparatus is that the force applied to the rear of the frame is not constant, but varies in proportion to the inequality of weight distribution, because upward movement of the rear of the frame 2 will increase the pressure on the body of fluid in the lower part of the cylinder 92 below the piston 91 and in the upper part of the cylinder 93 above the piston 96 and also in the communicating conduit 98. Likewise, as the quantity W2 minus W1 varies directly as the square of velocity or the speed of the vehicle, by the speed of the centrifugal governor controlled axle speed responsive rheostat mechanism, illustrated in Figure 5, the force will be proportionally varied.

It is, of course, to be understood that the above-described structure is merely illustrative of the manner in which the principles of our invention may be utilized and that we desire to comprehend within our invention such modifications as come within the scope of the claims and the invention.

Having thus fully described our invention, what we claim as new and desire to secure by Letters Patent is:

1. In a method of braking for railway vehicles having trucks, axles, wheels and wheel brakes, applying the vehicle wheel brakes and concurrently applying to the trucks of the vehicle corrective forces adapted to make uniform the downward force applied to the respective axles of the vehicle.

2. In a method of braking for railway vehicles having trucks, axles, wheels and wheel brakes, applying the vehicle wheel brakes while applying to the trucks of the vehicle downward forces adapted to equalize the downward force applied to the respective axles of the vehicle.

3. In a method of braking for railway vehicles having trucks, axles, wheels and wheel brakes, applying downward force to the truck frames immediately upon application of the wheel brakes to correct the inequality of weight distribution due to momentum and controlling the applied force proportionally with the vehicle speed.

4. In a method of braking for railway vehicles having trucks, axles, wheels and wheel brakes, applying downward force to the truck frames immediately upon application of the wheel brakes to correct the inequality of weight distribution due to momentum and controlling the applied force proportionally with the vehicle speed throughout deceleration.

5. In a method of braking for railway vehicles having trucks, axles, wheels and wheel brakes, applying to the trucks of the vehicle immediately upon application of the wheel brakes forces adapted to correct the inequality of weight distribution due to momentum and maintaining the applied forces proportional to the square of the vehicle speed throughout deceleration.

6. In a method of braking for railway vehicles having trucks, axles, wheels and wheel brakes, applying to the vehicle trucks immediately upon application of the wheel brakes corrective forces proportional to the speed of the vehicle to correct the inequality of weight distribution due to momentum, and maintaining the applied forces proportional to the vehicle speed throughout deceleration of the vehicle.

7. In a method of braking for railway vehicles having frames, and supporting trucks with axles, wheels and wheel brakes, applying to the trucks corrective forces to maintain the downward force uniform upon the axles of each truck, and applying to the vehicle frame forces to maintain uniform the downward forces upon the trucks of the vehicle.

8. In a method of braking for railway vehicles having frames, and supporting trucks with axles, wheels and wheel brakes, applying corrective forces to the trucks upon application of the wheel brakes to maintain the downward forces equal upon each axle of each truck, and applying to the vehicle frames forces to maintain equal the downward forces upon each of the trucks of each of the vehicles.

9. In a method of braking for a railway vehicle having a frame, and supporting trucks with axles, wheels and wheel brakes, applying corrective forces to the trucks upon application of the wheel brakes to maintain the downward forces equal upon each axle of each truck, applying to the vehicle frame forces to maintain equal the downward forces upon each of the trucks of the vehicle, and controlling the forces initially applied proportionally with the vehicle speed.

10. In a method of braking for a railway vehicle having a frame, and supporting trucks with axles, wheels and wheel brakes, applying corrective forces to the trucks upon application of the wheel brakes to maintain the downward force uniform upon the axles of each truck, applying to the vehicle frame forces to maintain equal the downward forces upon each truck of the vehicle, and controlling the forces initially applied proportionally with the speed of an axle of the vehicle.

11. In a method of braking for a railway vehicle having a frame, and supporting trucks with axles, wheels and wheel brakes, applying corrective forces to the trucks upon application of the wheel brakes to maintain the downward force uniform upon the axles of each truck, applying to the vehicle frame forces to maintain uniform the downward forces upon the trucks of the vehicle, controlling the forces initially applied proportionally with the vehicle speed, and maintaining the applied forces proportional to the vehicle speed throughout deceleration.

12. In a method of braking for a railway vehicle having a frame, and supporting trucks with axles, wheels and wheel brakes, applying corrective forces to the trucks upon application of the wheel brakes to maintain the downward force uniform upon the axles of each truck, applying to the vehicle frame forces to maintain uniform the downward forces upon the trucks of the vehicle, controlling the forces applied by the speed of a vehicle axle, and maintaining the applied forces proportional to the vehicle speed throughout deceleration.

13. In a method of braking for a railway vehicle having a frame and supporting trucks with axles, wheels and wheel brakes, applying corrective forces to the vehicle frame to maintain uniform the downward forces upon the trucks of the vehicle, and controlling the force initially applied proportionally with the speed of an axle of the vehicle.

14. In a method of braking for a railway vehicle having a frame and supporting trucks with axles, wheels and wheel brakes, applying corrective forces to the vehicle frame to maintain uniform the downward forces upon the trucks of the vehicle, and controlling the forces initially applied by the speed of the vehicle and maintaining the applied forces proportional to the vehicle momentum throughout deceleration.

15. In a method of braking for a railway vehicle having a frame and supporting trucks with axles, wheels and wheel brakes, applying corrective forces to the vehicle frame to maintain uniform the downward forces upon the trucks of the vehicle, controlling the applied forces by the speed of a vehicle axle, and maintaining the applied forces proportional to the speed of said axle throughout deceleration of the vehicle.

16. In a method of maintaining uniform traction between wheels of a railway vehicle and the supporting rails during application of the wheel brakes thereof, maintaining uniform the downward forces applied to the wheels of the vehicle by applying to the vehicle corrective forces proportional to the vehicle speed to counteract the redistribution of weight due to momentum.

17. In a method of maintaining uniform traction between wheels of a railway vehicle and the supporting rails during application of the wheel brakes thereof, maintaining uniform the downward forces applied to the trucks of the vehicle by applying to the vehicle corrective forces proportional to the vehicle speed to counteract the redistribution of weight due to momentum.

18. In a method of maintaining uniform traction between wheels of a railway vehicle and the supporting rails during application of the wheel brakes thereof, maintaining uniform the downward forces applied to the wheels of each truck by applying to the truck corrective forces proportional to the vehicle speed, and maintaining uniform the downward forces applied to the respective trucks to counteract the redistribution of weight due to momentum.

19. In traction control means for a railway vehicle truck having axles, wheels and wheel brakes; means operative upon application of the wheel brakes to apply to said truck forces corrective of unequal weight distribution due to momentum, and means for maintaining the applied forces proportional to the speed of the vehicle.

20. In traction control means for a railway vehicle truck having axles, wheels and wheel brakes; means operative upon application of the wheel brakes to apply to said truck forces corrective of unequal weight distribution due to momentum, and means for maintaining the applied forces proportional to the square of the speed of the vehicle.

21. In traction control means for a railway vehicle truck having axles, wheels and wheel brakes; means operative upon application of the wheel brakes to apply to said truck forces corrective of unequal weight distribution due to momentum, and means for maintaining the applied forces proportional to the speed of a vehicle axle.

22. In traction control means for a railway vehicle truck having axles, wheels and wheel brakes; means operative upon application of the wheel brakes to applying to said truck forces corrective of unequal weight distribution due to momentum, and means for maintaining the applied forces proportional to the square of the speed of a vehicle axle.

23. In traction control means for a railway vehicle truck having axles, wheels and wheel brakes; means operative upon application of the wheel brakes to apply to said truck forces corrective of unequal weight distribution due to momentum, and means for maintaining the applied forces proportional to the momentum.

24. In traction control means for a railway vehicle truck having axles, wheels and wheel brakes; means operative upon application of the wheel brakes to apply to said truck forces corrective of unequal weight distribution due to momentum, and means for maintaining the applied forces proportional to the momentum during application of the wheel brakes.

25. In traction control means for a railway vehicle having a frame, frame supporting trucks with axles and wheels, and wheel brakes; means including electromagnetic track brakes at the rear of the vehicle, means responsive to axle speed for varying the intensity of track brakes energization during energization, and means responsive to wheel brake application to energize said track brakes to apply downward force proportional to the vehicle axle speed at the rear of the frame to maintain equality of downward force applied to each truck during deceleration of the vehicle.

26. In traction control means for a railway vehicle having a frame, frame supporting trucks with axles and wheels, and wheel brakes; means including electromagnetic track brakes suspended at the rear of the vehicle frame and means operative automatically upon wheel brake application to energize said track brakes to apply downward force at the rear of the frame to maintain equality of downward force applied to each truck during deceleration.

27. In traction control means for a railway vehicle having a frame, frame supporting trucks with axles and wheels, and wheel brakes; means including electromagnetic track brakes at the rear of the vehicle frame, means to vary the intensity of energization of said track brakes, and means operative upon wheel brake application to energize said track brakes to apply corrective downward force at the rear of the frame to maintain the level position of said frame against the force of momentum.

28. In traction control means for a railway vehicle having a frame, frame supporting trucks with axles and wheels, and wheel brakes; means to apply downward force at the rear of the frame to maintain said frame level against the force of momentum, and momentum responsive means for making said first-named means operative.

29. In traction control means for a railway vehicle having a frame, frame supporting trucks with axles and wheels, and wheel brakes; means, including electromagnetic track brakes suspended at the rear of the frame, to apply downward force at the rear of the frame to maintain said frame level against the tilting force of vehicle momentum, and momentum responsive means adapted automatically to make said first-named means operative upon application of the vehicle wheel brakes.

30. In traction control means for a railway vehicle having a frame, frame supporting trucks with axles and wheels, and wheel brakes; means to apply downward force at the rear of the frame to maintain the equality of downward force applied to each truck during deceleration, and means including an axle speed responsive rheostat for maintaining the applied force proportional during deceleration to the velocity of said vehicle.

31. In traction control means for a railway vehicle having a frame, frame supporting trucks with axles and wheels, and wheel brakes; means to apply downward force at the rear of the frame to maintain the equality of downward force applied to each truck during deceleration, and means including an axle speed responsive rheostat for maintaining the applied force proportional during deceleration to the square of the velocity of said vehicle.

32. In traction control means for a railway vehicle having a frame, frame supporting trucks with axles and wheels, and wheel brakes; means including electromagnetic brakes at the rear of said frame operative automatically upon wheel brake application to apply downward force at the rear of the frame to maintain the level position of said frame against the force of momentum, and means including an axle speed responsive rheostat for maintaining the applied force proportional to the vehicle momentum during deceleration.

33. In traction control means for a railway vehicle having a frame, frame supporting trucks with axles and wheels, and wheel brakes; means including electromagnetic track brakes suspended at the rear of the vehicle and made operative upon wheel brake application to apply downward force at the rear of the frame to counterbalance the force applied to said frame by the vehicle momentum, and means including an axle speed responsive rheostat for maintaining the applied force proportional to the vehicle momentum during application of the wheel brakes.

34. In traction control means for a railway vehicle having a frame, frame supporting trucks with axles and wheels, and wheel brakes; means including electromagnetic track brakes suspended at the rear of the vehicle and made operative upon wheel brake application to apply downward force at the rear of the frame to counterbalance the force applied to said frame by the vehicle momentum, and means including an axle speed responsive rheostat connected in the energizing circuit of said electromagnetic brakes for maintaining the applied force proportional to the square of the vehicle speed throughout application of the vehicle wheel brakes.

35. In traction control means for a railway vehicle having a frame, frame supporting trucks with axles and wheels, and wheel brakes; means including electromagnetic track brakes on said frame operative to apply forces to said frame to compensate for weight redistribution between the trucks due to momentum, and means responsive to wheel brake application to initiate operation of said last-named means.

36. In traction control means for a railway vehicle having a frame, frame supporting trucks with axles and wheels, and wheel brakes; means including electromagnetic track brakes on said frame operative to apply forces to said frame to compensate for weight redistribution between the trucks due to momentum, and means operating automatically upon deceleration of the vehicle due to wheel brake application to initiate operation of said last-named means.

37. In traction control means for a railway vehicle having a frame, frame supporting trucks with axles and wheels, and wheel brakes; means including electromagnetic track brakes on said frame and momentum responsive switch means for said track brakes automatically operative upon wheel brake application to cause energization of said electromagnetic track brakes to apply forces to said frame to compensate for weight redistribution between the respective trucks due to vehicle momentum.

38. In traction control means for a railway vehicle having a frame, frame supporting trucks with axles and wheels, and wheel brakes; means operative upon wheel brake application to apply forces to said frame to compensate for weight redistribution between trucks due to momentum, and means to apply forces to each truck to compensate for weight redistribution between the axles of each truck due to momentum.

39. In traction control means for a railway vehicle having a frame, frame supporting trucks with axles and wheels, and wheel brakes; means responsive to wheel brake application to apply forces to said frame to compensate for weight redistribution between trucks due to momentum, and means operable simultaneously with said first-named means to apply forces to each truck to compensate for weight redistribution between the axles of each truck due to momentum.

40. In traction control means for a railway vehicle having a frame, frame supporting trucks with axles and wheels, and wheel brakes; means operative upon wheel brake application to apply forces to said frame to compensate for weight redistribution between trucks due to momentum, means to apply forces to each truck to compensate for weight redistribution between the axles of each truck due to momentum, and means for maintaining the forces applied to said trucks proportional to the momentum during wheel brake application.

41. In traction control means for a railway vehicle having a frame, frame supporting trucks with axles and wheels, and wheel brakes; means operative upon wheel brake application to apply forces to said frame to compensate for weight redistribution between trucks due to momentum, means to apply forces to each truck to compensate for weight redistribution between the axles of each truck due to momentum, and means for maintaining the forces applied to said trucks proportional to the speed of the vehicle during wheel brake application.

42. In traction control means for a railway vehicle having a frame, frame supporting trucks with axles and wheels, and wheel brakes; means operative upon wheel brake application to apply forces to said frame to compensate for weight redistribution between trucks due to momentum, means to apply forces to each truck to compensate for weight redistribution between the axles of each truck due to momentum, and means for maintaining the forces applied to said trucks proportional to the square of the vehicle speed during wheel brake application.

43. In traction control means for a railway vehicle having a frame, frame supporting trucks with axles and wheels, and wheel brakes; means operative upon wheel brake application to apply forces to said frame to compensate for weight redistribution between trucks due to momentum, means to apply forces to each truck to compensate for weight redistribution between the axles of each truck due to momentum, and means for maintaining the forces applied to said trucks proportional to the speed of a vehicle axle during wheel brake application.

44. In traction control means for a railway vehicle having a frame, frame supporting trucks with axles and wheels, and wheel brakes; means operative upon wheel brake application to apply forces to said frame to compensate for weight redistribution between trucks due to momentum, means to apply forces to each truck to compensate for weight redistribution between the axles of each truck due to momentum, and means for maintaining the forces applied to said trucks proportional to the square of the speed of a vehicle axle during wheel brake application.

45. In traction control means for a railway vehicle having a frame, frame supporting trucks with axles and wheels, and wheel brakes; means including electromagnetic track brakes on said frame to compensate for weight redistribution between trucks due to momentum, means responsive to momentum upon wheel brake application to cause said first-named means to operate, means including electromagnetic track brakes on each truck to apply forces to each truck to compensate for weight redistribution between the axles of said truck due to momentum upon wheel brake application, and means including an axle speed responsive magnetic brake control rheostat for maintaining the forces applied to said frame proportional to the momentum during wheel brake application.

46. In traction control means for a railway vehicle having a frame, frame supporting trucks with axles and wheels, and wheel brakes; means including electromagnetic track brakes on said frame to compensate for weight redistribution between trucks due to momentum, means responsive to momentum upon wheel brake application to cause said first-named means to operate, means including electromagnetic track brakes on each truck to apply forces to each truck to compensate for weight redistribution between the axles of said truck due to momentum upon wheel brake application, and means including an axle speed responsive magnetic brake control rheostat for maintaining the forces applied to said frame proportional to the speed of the vehicle during wheel brake application.

47. In traction control means for a railway vehicle having a frame, frame supporting trucks with axles and wheels, and wheel brakes; means including electromagnetic track brakes on said frame to compensate for weight redistribution between trucks due to momentum, means responsive to momentum upon wheel brake application to cause said first-named means to operate, means including electromagnetic track brakes on each truck to apply forces to each truck to compensate for weight redistribution between the axles of said truck due to momentum upon wheel brake application, and means including an axle speed responsive magnetic brake control rheostat for maintaining the forces applied to said frame proportional to the square of the vehicle speed during wheel brake application.

48. In traction control means for a ralway vehicle having a frame, frame supporting trucks with axles and wheels, and wheel brakes; means including electromagnetic track brakes on said frame to compensate for weight redistribution between trucks due to momentum, means responsive to momentum upon wheel brake application to cause said first-named means to operate, means including electromagnetic track brakes on each truck to apply forces to each truck to compensate for weight redistribution between the axles of said truck due to momentum upon wheel brake application, and means including an axle speed responsive magnetic brake control rheostat for maintaining the forces applied to said frame proportional to the speed of a vehicle axle during wheel brake application.

49. In traction control means for a railway vehicle having a frame, frame supporting trucks with axles and wheels, and wheel brakes; means including electromagnetic track brakes on said frame to compensate for weight redistribution between trucks due to momentum, means responsive to momentum upon wheel brake application to cause said first-named means to operate, means including electromagnetic track brakes on each truck to apply forces to each truck to compensate for weight redistribution between the axles of said truck due to momentum upon wheel brake application, and means including an axle speed responsive magnetic brake control rheostat for maintaining the forces applied to said frame proportional to the square of the speed of a vehicle axle during wheel brake application.

50. In means for applying to a vehicle frame forces to counteract the tilting force exerted thereon by momentum upon wheel brake application; electromagnetic track brakes on said frame, and momentum responsive means for causing energization of said track brakes.

51. In means for applying to a vehicle frame forces to counteract the tilting force exerted thereon by momentum upon wheel brake application; electromagnetic track brakes mounted at the rear of said frame, and momentum responsive means for causing energization of said track brakes upon wheel brake application.

52. In means for applying to a vehicle frame forces to counteract the tilting force exerted thereon by momentum upon wheel brake application; electromagnetic track brakes mounted at the rear of said frame, momentum responsive means for causing energization of said track brakes upon brake application, and speed responsive brake control rheostat means for maintaining the downward force applied by said brakes proportional to momentum during wheel brake application.

53. In means for applying to a vehicle frame forces to counteract the tilting force exerted thereon by momentum upon wheel brake application; electromagnetic track brakes mounted at the rear of said frame and automatically energized upon track brake application, and speed responsive brake control rheostat means for maintaining the downward force applied by said brakes proportional to momentum of the vehicle during application of the wheel brakes thereof.

54. In means for applying to a vehicle frame forces to counteract the tilting force exerted thereon by momentum upon wheel brake application; electromagnetic track brakes resiliently mounted at the rear of said frame, and speed responsive brake control rheostat means for maintaining the energization of said track brakes proportional to momentum of the vehicle during wheel brake application.

55. In means for applying to a vehicle frame forces to counteract the tilting force exerted thereon by momentum upon wheel brake application; electromagnetic track brakes mounted at the rear of said frame, speed responsive brake control rheostat means for maintaining the downward force applied to said brakes proportional to momentum of the vehicle during application of the wheel brakes thereof, and means including fluid pressure connections between said brakes and the bolster of the rear truck of said vehicle for causing the downward force applied to said brakes to be exerted at the bolster of the rear truck and also at the rear of the vehicle frame.

56. In means for applying downward force to the rear end of a railway vehicle provided with a frame, and trucks having bolsters connected to said frame and supported on springs on the trucks; a fluid cylinder rigid with the rear truck, a piston in said cylinder, a rod connecting said piston and the bolster of the truck, a pair of fluid cylinders rigid with the rear end of said frame, a piston in each cylinder, a pair of rods each having its upper end connected to one of said pistons and its lower end connected to a magnetic track brake, and fluid connections between the lower ends of each of said pair of cylinders and the upper end of said first-named cylinder, and between the upper ends of each of said pair of cylinders and the lower end of said first-named cylinder.

57. In means for applying downward force to the rear end of a railway vehicle provided with a frame, and trucks having bolsters connected to said frame and supported on springs on the trucks; a fluid cylinder rigid with the rear truck, a piston in said cylinder, a rod connecting said piston and the bolster of the truck, a pair of fluid cylinders rigid with the rear end of said frame, a piston in each cylinder, a pair of rods each having its upper end connected to one of said pistons and its lower end connected to a magnetic track brake, fluid connections between the lower ends of each of said pair of cylinders and the upper end of said first-named cylinder, and between the upper ends of each of said pair of cylinders and the lower end of said first-named cylinder, and means to energize said magnetic track brakes upon application of the wheel brakes of the vehicle to exert downward force at the rear of the vehicle frame and at the rear truck bolster.

58. In means for applying downward force to the rear end of a railway vehicle provided with a frame, and trucks having bolsters connected to said frame and supported on springs on the trucks; a fluid cylinder rigid with the rear truck, a piston in said cylinder, a rod connecting said piston and the bolster of the truck, a pair of fluid cylinders rigid with the rear end of said frame, a piston in each cylinder, a pair of rods each having its upper end connected to one of said pistons and its lower end connected to a magnetic track brake, fluid connections between the lower ends of each of said pair of cylinders and the upper end of said first named cylinder, and between the upper ends of each of said pair of cylinders and the lower end of said first-named cylinder, means to energize the track brakes upon application of the vehicle wheel brakes, and means to so adjust the intensity of energization of said brakes as to maintain the downward force exerted thereby proportional to the momentum of the vehicle during braking.

59. In means for applying downward force to the rear end of a railway vehicle provided with a frame, and trucks having bolsters connected to said frame and supported on springs on the trucks; a fluid cylinder rigid with the rear truck, a piston in said cylinder, a rod connecting said piston and the bolster of the truck, a pair of fluid cylinders rigid with the rear end of said frame, a piston in each cylinder, a pair of rods each having its upper end connected to one of said pistons and its lower end connected to a magnetic track brake, fluid connections between the lower ends of each of said pair of cylinders and the upper end of said first-named cylinder, and between the upper ends of each of said pair of cylinders and the lower end of said first-named cylinder, means to energize the track brakes upon application of the vehicle wheel brakes, and means to so adjust the intensity of energization of said brakes as to maintain the downward force exerted thereby proportional to the speed of the vehicle during braking.

60. In means for applying downward force to the rear end of a railway vehicle provided with a frame, and trucks having bolsters connected to said frame and supported on springs on the trucks; a fluid cylinder rigid with the rear truck, a piston in said cylinder, a rod connecting said piston and the bolster of the truck, a pair of fluid cylinders rigid with the rear end of said frame, a piston in each cylinder, a pair of rods each having one end connected to one of said pistons and its other end connected to a magnetic track brake, fluid connections between the lower ends of each of said pair of cylinders and the upper end of said first-named cylinder, and between the upper ends of each of said pair of cylinders and the lower end of said first-named cylinder, inertia responsive switch means operative to cause energization of the track brakes upon application of the vehicle wheel brakes, and means operative to so adjust the intensity of energization of said brakes as to maintain the downward force exerted thereby proportional to the momentum of the vehicle at all times during braking.

THEODORE H. SCHOEPF.
DAVID M. RITCHIE.